United States Patent
Arunachalam

(10) Patent No.: US 11,803,245 B2
(45) Date of Patent: Oct. 31, 2023

(54) SCALABLE DISTRIBUTED DATA ARCHITECTURE

(71) Applicant: HARMAN INTERNATIONAL INDUSTRIES, INCORPORATED, Stamford, CT (US)

(72) Inventor: Srinath Arunachalam, Dallas, TX (US)

(73) Assignee: Harman International Industries, Incorporated, Stamford, CT (US)

(*) Notice: Subject to any disclaimer, the term of this patent is extended or adjusted under 35 U.S.C. 154(b) by 755 days.

(21) Appl. No.: 16/733,970

(22) Filed: Jan. 3, 2020

(65) Prior Publication Data
US 2020/0218927 A1    Jul. 9, 2020

Related U.S. Application Data

(60) Provisional application No. 62/790,425, filed on Jan. 9, 2019.

(51) Int. Cl.
*G06F 3/01* (2006.01)
*H04L 67/12* (2022.01)
(Continued)

(52) U.S. Cl.
CPC .............. *G06F 3/017* (2013.01); *G06V 10/96* (2022.01); *G06V 20/52* (2022.01); *G06V 40/107* (2022.01);
(Continued)

(58) Field of Classification Search
CPC ...... G06V 10/40; G06V 40/20; G06V 10/248; G06V 10/96; G06V 20/52; G06V 40/107;
(Continued)

(56) References Cited

U.S. PATENT DOCUMENTS 9,423,886 B1    8/2016 Neglur et al.
2005/0057653 A1*    3/2005 Maruya ............... H04N 7/181
                                                    348/E7.086
(Continued)

FOREIGN PATENT DOCUMENTS

DE    10 2018 107 744 A1    10/2018
JP         2002-260166 A    9/2002

OTHER PUBLICATIONS

German Search Report for application No. 102020100283.1 dated Nov. 11, 2020.

*Primary Examiner* — Christopher M Brandt
(74) *Attorney, Agent, or Firm* — Artegis Law Group, LLP

(57) ABSTRACT

One or more embodiments include a direct message handler module executing on an endpoint device, such as a direct message handler device. The direct message handler module receives first sensor data via a first sensor. The direct message handler module receives, from a first coordinator, a command to perform a first operation, the first coordinator being selected from a plurality of endpoint devices that includes the first endpoint device. In response to receiving the command, the direct message handler module performs the first operation to extract a first feature from the first sensor data. The direct message handler module transmits a first message that includes data associated with the first feature to the plurality of endpoint devices.

18 Claims, 8 Drawing Sheets

(51) Int. Cl.
*H04L 67/10* (2022.01)
*G06V 40/20* (2022.01)
*G06V 10/96* (2022.01)
*G06V 20/52* (2022.01)
*G06V 40/10* (2022.01)

(52) U.S. Cl.
CPC .............. *G06V 40/20* (2022.01); *H04L 67/10* (2013.01); *H04L 67/12* (2013.01)

(58) Field of Classification Search
CPC ......... G06F 3/017; H04L 67/10; H04L 67/12; H04L 67/5651; H04L 41/0668; H04L 47/10
See application file for complete search history.

(56) References Cited

U.S. PATENT DOCUMENTS

| | | | |
|---|---|---|---|
| 2006/0165405 A1* | 7/2006 | Kanai | H04N 5/247 386/E5.072 |
| 2007/0014439 A1* | 1/2007 | Ando | G08B 31/00 382/118 |
| 2015/0172539 A1 | 6/2015 | Neglur | |
| 2015/0249566 A1* | 9/2015 | Kim | H04L 41/0695 714/4.11 |
| 2016/0366219 A1* | 12/2016 | Ohana | H04L 67/1034 |
| 2018/0018504 A1* | 1/2018 | Sotodate | G06V 20/52 |
| 2018/0295011 A1 | 10/2018 | Wang et al. | |
| 2019/0043207 A1* | 2/2019 | Carranza | G06V 40/172 |
| 2019/0188876 A1* | 6/2019 | Song | G06T 7/70 |

\* cited by examiner

SCALABLE DISTRIBUTED DATA ARCHITECTURE

CROSS-REFERENCE TO RELATED APPLICATIONS

This application claims the benefit of United States provisional patent application titled "Scalable Distributed Data Architecture," filed on Jan. 9, 2019 and having Ser. No. 62/790,425. The subject matter of this related application is hereby incorporated herein by reference.

BACKGROUND

Field of the Embodiments

Embodiments of the present invention relate generally to computing devices and, more specifically, to a scalable distributed data architecture.

Description of the Related Art

In a distributed system, such as an "Internet of Things" (IoT) architecture, computing devices fitted with one or more sensors are embedded into everyday devices, such as video cameras, thermostats, kitchen appliances, and the like. These computing devices, also referred to herein as "endpoint devices," communicate over a wired or wireless communications network, thereby enabling the computing devices to transmit data to and receive data from other computing devices that are reachable via the communications network. More specifically, each endpoint device continuously receives data from one or more associated sensors, and transmits the sensor data to a gateway device. In general, endpoint devices transmit raw sensor data without performing any analysis or processing of the sensor data prior to transmission. The endpoint devices can also receive data, such as configuration data, via the gateway device.

Traditionally, the network over which the endpoint devices and the gateway device communicate is compatible with communication using the user datagram protocol (UDP) or the transmission control protocol (TCP). In a UDP and/or TCP compatible network, each endpoint device and gateway device is configured as either a client or as a server. The gateway device, in turn, forwards the sensor data to other computing devices, such as a data aggregators and/or cloud servers. The data aggregators and/or cloud servers process the sensor data and initiate various operations based on the sensor data. In one example, a data aggregator or cloud server may process sensor data received from a video camera to determine that an intruder is present. In response, the data aggregator or cloud server transmit a notification to a security monitoring company or a local police force for further action.

One drawback with conventional distributed system, however, is that, as endpoint devices and associated sensors improve in performance and resolution over time, the amount of sensor data transmitted over the network can increase significantly. In one example, a distributed system for a conference room may include multiple video cameras to track one or more persons in the conference room and to orient highly directional loudspeakers towards each of the persons as they move about the conference room. A typical high-definition video camera may have an image frame resolution of 1080 pixels per line×720 lines, a bit depth of 24 bits per pixel, and a frame capture rate of 24 frames per second (fps). Such a high-definition video camera may transmit a compressed video stream of pixel data that requires a bandwidth of approximately 447 Megabits per second (Mbps). If four such video cameras are needed to cover the entire area of the conference room, the total amount of video data transmitted by the four video cameras would be 4×447 Mbps or 1,788 MBps. Further, the amount of video data transmitted over the network increases linearly as more video cameras are added to the distributed system.

In general, this amount of data consumes a significant percentage of the available bandwidth of a typical communications network. As a result, the latency between the time that an endpoint device transmits the video data and the time that the data aggregator or cloud server receives the video data may increase significantly as the number of video cameras on the communications network increases. Further, the amount of processing resources needed by the data aggregator or cloud server may be significant, further increasing the latency between the time that an endpoint device transmits the video data and the time that the data aggregator or cloud server performs a responsive action. As a result, the performance of the distributed system may be unacceptably low, thereby reducing the usability of the person-tracking distributed system.

As the foregoing illustrates, what is needed in the art are more effective techniques for processing sensor data in a distributed system.

SUMMARY

Various embodiments of the present disclosure set forth a computer-implemented method for processing sensor data by a first endpoint device of a plurality of endpoint devices. The endpoint device is also referred to herein as distributed message handler (DMH) device. The method includes receiving first sensor data via a first sensor. The method further includes receiving, from a first coordinator, a command to perform a first operation, the first coordinator being selected from the plurality of endpoint devices that includes the first endpoint device. The method further includes, in response to receiving the command, performing the first operation to extract a first feature from the first sensor data. The method further includes transmitting a first message that includes data associated with the first feature to the plurality of endpoint devices.

Other embodiments include, without limitation, a first endpoint device, or other system, that implements one or more aspects of the disclosed techniques, and a computer-readable medium including instructions for performing one or more aspects of the disclosed techniques.

At least one technical advantage of the disclosed techniques relative to the prior art is that the endpoint devices in a distributed system transmit less sensor data relative to conventional approaches. Rather than transmitting raw sensor data to a remote data aggregator or cloud server, each endpoint device extracts one or more features represented by the sensor data. Each endpoint device transmits messages including only data associated with the extracted features to the other endpoint devices on the local communications network. As a result, the amount of data transmitted via the communications network may be significantly reduced. Similarly, the processing power needed to process the messages may be significantly less than the processing power needed to process the raw sensor data. Further, the endpoint device designated as the coordinator determines the type of analysis that the endpoint devices perform at any given time, leading to reduced processing requirements for the endpoint devices. As a result, the latency of the distributed system is lower and the performance of the distributed system is higher relative to conventional approaches.

Another advantage of the disclosed techniques is that, when the endpoint device designated as the coordinator fails, the remaining endpoint devices automatically elect a new coordinator from among the remaining endpoint devices. As a result, the distributed system is resilient to endpoint device failure, leading to a more robust distributed system relative to prior approaches. These technical advantages represent one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of certain specific embodiments. However, it will be apparent to one of skill in the art that other embodiments may be practiced without one or more of these specific details or with additional specific details.

As further described herein, multiple endpoint devices, such as device message handler devices, are equipped with sensors to acquire sensor data. The endpoint devices communicate with each other over a distributed domain, referred to herein as a "private communications network," in order to transmit, receive, and process sensor-related data in a scalable manner. The endpoint devices communicate with each other by passing data as messages or objects over the private communications network, where the messages or objects are agnostic as to the type of endpoint devices or corresponding sensors. The set of endpoint devices are self-sufficient and do not require a designated central server to process the sensor data. More specifically, the endpoint devices form a private communications network, where any endpoint device connected to the private communications network is capable of serving as the coordinator of the analysis and/or detection performed by the endpoint devices. Further, if the current coordinator fails or otherwise stops communicating with the private communications network, the remaining endpoint devices elect one of the remaining endpoint devices as the subsequent coordinator. The subsequent coordinator assumes the activities of the prior coordinator without disruption of the service.

System Overview

In the descriptions of FIGS. 1-7, embodiments of the distributed system are generally described with respect to a camera-based monitoring system in a conference room environment. However, it is understood that the various embodiments of the distributed system may be used with other environments of interest, such as a home environment, an office environment, an industrial environment, and/or the like that may contain sensor sensors other than or in addition to camera-based sensors.

Figure 1:
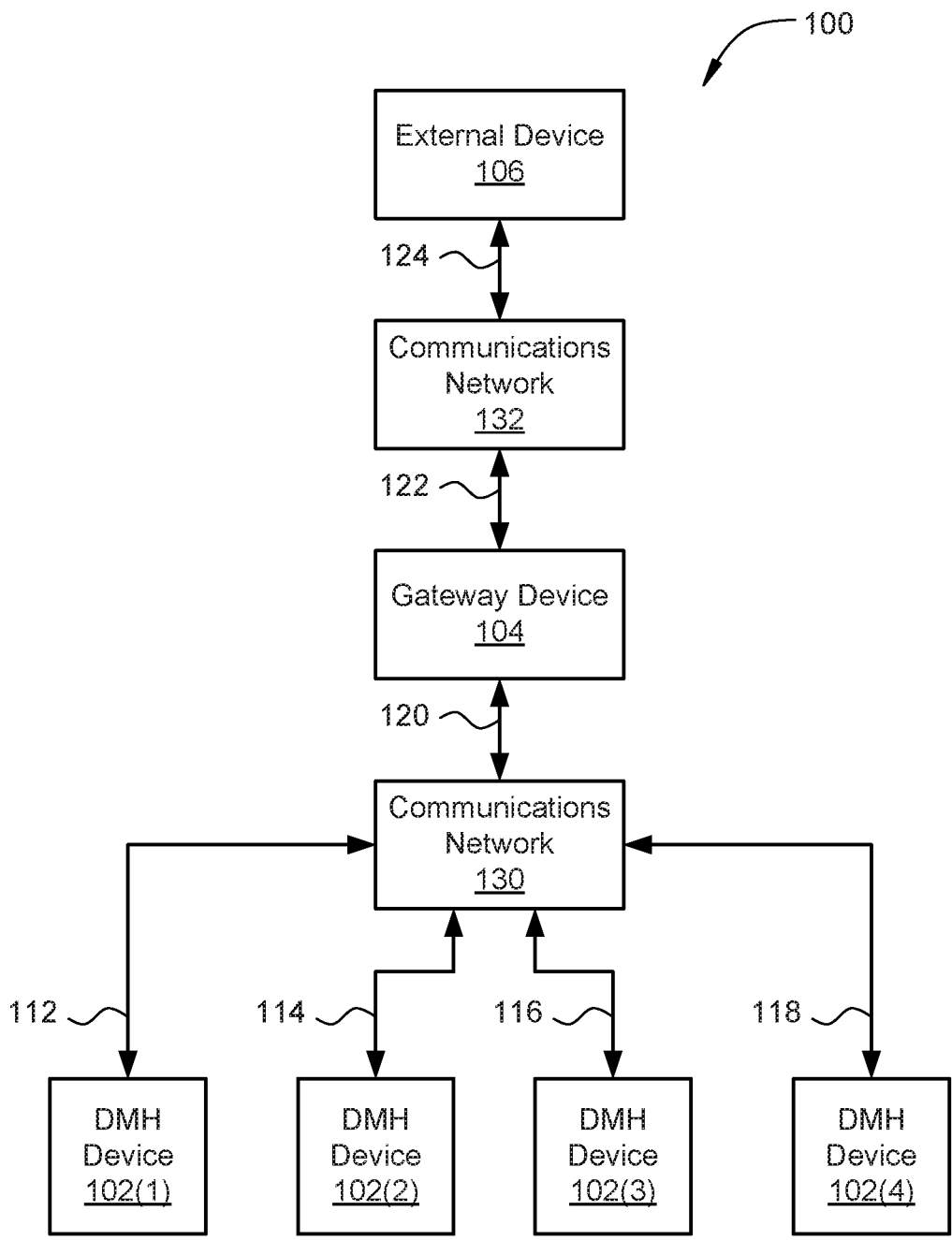
FIG. 1 illustrates a distributed system configured to implement one or more aspects of the present disclosure.

FIG. 1 illustrates a distributed system 100 configured to implement one or more aspects of the present disclosure. Distributed system 100 may be an "Internet of Things" (IoT) architecture, a distributed data architecture, and/or the like. As shown, distributed system 100 includes, without limitation, distributed message handler (DMH) devices 102(1), 102(2), 102(3), and 102(4), gateway device 104, and external device 106 in communication with each other via communications networks 130 and 132. Distributed message handler devices 102(1), 102(2), 102(3), and 102(4) are collectively referred to herein as distributed message handler devices 102. Communications networks 130 and 132 may be any suitable environment to enable communications among remote or local computer systems and computing devices, including, without limitation, Bluetooth communications channels, wireless and wired Local Area Networks (LANs), Internet-based Wide Area Networks (WANs), cellular networks, and/or the like.

Each of distributed message handler devices 102 includes, without limitation, a computing device that may be an IoT device, personal computer, personal digital assistant, tablet computer, mobile phone, mobile device, or any other device suitable for implementing one or more aspects of the present invention. Illustratively, distributed message handler devices 102(1), 102(2), 102(3), and 102(4) attach to communications network 130 via communications links 112, 114, 116, and 118, respectively.

In operation, distributed message handler devices 102 that offer a particular service form a private communications network and exchange data associated with the service in a scalable manner. The distributed message handler devices 102 form the private communications network as a subset of communications network 130. The distributed message handler devices 102 perform a process to elect one of the distributed message handler devices 102 as a coordinator. Upon being elected, the coordinator transmits trigger events to the distributed message handler devices 102 to control the type of analysis and detection that each of the distributed message handler devices 102 in the private communications network perform. The types of analysis and detection include, without limitation, gesture detection, object detection, angle detection, and/or the like. In response, each distributed message handler device 102 receives sensor data from the corresponding sensors, performs analysis and/or detection on the sensor data, and extracts certain features from the sensor data, according to the trigger events received from the coordinator. The distributed message handler devices 102 that detect one or more features transmit messages to all the distributed message handler devices 102, including the coordinator. The messages include data that identify the detected features.

The distributed message handler devices 102 other than the coordinator, referred to herein as non-coordinators, store the received messages in a data store without taking any action. The coordinator likewise stores the received messages, performs analysis on the received messages, and performs one or more responsive actions. The responsive actions include, without limitation, transmitting trigger events to the distributed message handler devices 102 to start, stop, or modify the analysis and/or detection performed by the distributed message handler devices 102. The responsive actions further include, without limitation, transmitting messages to one or more distributed message handler devices 102 to change a configuration, mode of operation, or other aspect of the distributed message handler devices 102, such as the zoom level or panning direction of a camera associated with a distributed message handler device 102. The responsive actions further include, without limitation, transmitting messages to one or more external devices, such as external device 106, to change a configuration, mode of operation, or other aspect of the external devices.

Because each distributed message handler device 102 has previously recorded messages transmitted by the other distributed message handler devices 102, any of the distributed message handler devices 102 are able to assume the role of the coordinator. In the event that the coordinator stops communicating with the distributed message handler devices 102, such as when the coordinator experiences a system failure, the remaining distributed message handler devices 102 elect one of the remaining distributed message handler devices 102 as a subsequent coordinator. The subsequent coordinator retrieves the previously stored messages and begins performing the operations associated with the coordinator. As a result, the remaining distributed message handler devices 102 continue to provide the service even when the coordinator fails.

Gateway device 104 includes, without limitation, a computing device that may be a router, switch, gateway, firewall, access point, or any other device suitable for implementing one or more aspects of the present disclosure. Illustratively, gateway device 104 communicates with distributed message handler devices 102 over communications network 130 via communications link 120. Similarly, gateway device 104 communicates with external device 106 over communications network 132 via communications link 122.

In operation, gateway device 104 provides a connection between distributed message handler devices 102 and external device 106. As described herein, the distributed message handler device 102 elected as the coordinator performs responsive actions based on the messages received from distributed message handler devices 102. The responsive actions may include transmitting messages to external device 106 to change a configuration, mode of operation, or other aspect of external device 106. In such cases, the coordinator transmits a message that is received by gateway device 104 via communications network 130. Gateway device 104, in turn, transmits the message to external device 106 via communications network 132. Similarly, external device 106 may transmit messages to the coordinator, where the messages include status information, configuration data, and the like. In such cases, external device 106 transmits a message that is received by gateway device 104 via communications network 132. Gateway device 104, in turn, transmits the message to the coordinator via communications network 130.

External device 106 includes, without limitation, a computing device that may be a standalone server, a cluster or "farm" of servers, one or more network appliances, or any other device suitable for implementing one or more aspects of the present disclosure. Illustratively, external device 106 communicates over communications network 132 via communications link 122.

In operation, external device 106 receives messages from the distributed message handler device 102 elected as the coordinator. External device may be any device that is controllable via a communications network, such as communications networks 130 and 132. The messages command external device 106 to perform various functions. In one example, external device 106 may be a highly directional loudspeaker (HDL). Such a highly directional loudspeaker may be configured to form a directional beam of sound that has a specified beam width and a specified direction, also referred to herein as the "sweet spot." The coordinator may transmit messages to the highly directional loudspeaker to increase or decrease the beam width. Further, the coordinator may transmit messages to the highly directional loudspeaker to change the direction of the beam. In another example, external device 106 may be a microphone. The coordinator may transmit messages to the microphone to turn the microphone on or off. Further, the coordinator may transmit messages to the microphone to increase or decrease the microphone sensitivity.

External device 106 may also transmit messages to the distributed message handler device 102 elected as the coordinator. These messages may include confirmation that external device 106 has performed a command included in previous message. Further, these messages may include status information related to external device 106.

It will be appreciated that the system shown herein is illustrative and that variations and modifications are possible. In one example, distributed system 100 may include any technically feasible number and/or type of distributed message handler devices 102, gateway devices 104, and external devices 106, within the scope of this disclosure. In another example, distributed message handler devices 102 may have different capabilities for the same service. In such cases, each of distributed message handler devices 102 may provide a baseline set of capabilities for the service, while a subset of distributed message handler devices 102 may provide one or more enhanced capabilities. In yet another example, distributed message handler devices 102, gateway device 104, and external device 106 are illustrated with a particular communications network configuration that includes communications networks 130 and 132. However, distributed message handler devices 102, gateway device 104, and external device 106 may be configured in any technically feasible manner and may communicate over any number of communications networks. In this regard, distributed message handler devices 102 and external device 106 may be in communication with the same communications network. In such cases, the distributed message handler devices 102 may communicate with external device 106 without transmitting the messages via gateway device 104. The various functions and features of distributed message handler devices 102 are now described.

Operations of the Distributed System

Figure 2:
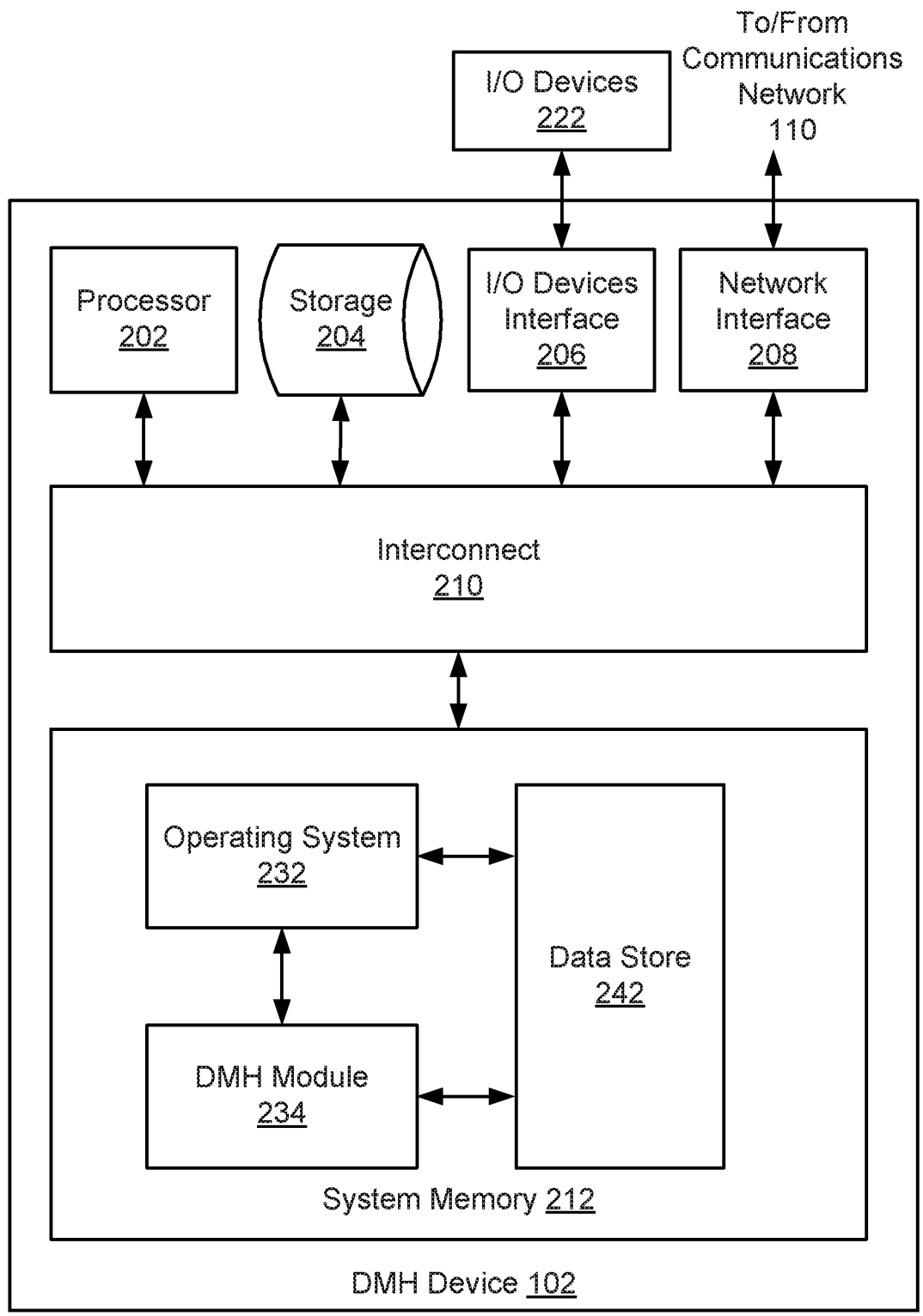
FIG. 2 is a more detailed illustration of the distributed message handler device of FIG. 1, according to various embodiments.

FIG. 2 is a more detailed illustration of the distributed message handler device 102 of FIG. 1, according to various embodiments. As shown, distributed message handler device 102 includes, without limitation, a processor 202, storage 204, an I/O devices interface 206, a network interface 208, an interconnect 210, and a system memory 212.

Processor 202 retrieves and executes programming instructions stored in system memory 212. Similarly, processor 202 stores and retrieves application data residing in system memory 212. Interconnect 210 facilitates transmission, such as of programming instructions and application data, between processor 202, I/O devices interface 206, storage 204, network interface 208, and system memory 212. The I/O devices interface 206 is configured to receive input data from and transmit data to I/O devices 222. Examples of I/O devices 222 may include one or more buttons, a keyboard, a mouse or other pointing device, and/or the like. The I/O devices interface 206 may also include an audio output unit configured to generate an electrical audio output signal, and I/O devices 222 may further include a speaker configured to generate an acoustic output in response to the electrical audio output signal. Another example of an I/O device 222 is a display device that generally represents any technically feasible means for generating an image for display. For example, the display device could be a liquid crystal display (LCD) display, organic light-emitting diode (OLED) display, or digital light processing (DLP) display. The display device may be a TV that includes a broadcast or cable tuner for receiving digital or analog television signals. The display device may be included in a VR/AR headset or a heads-up display (HUD) assembly. Further, the display device may project an image onto one or more surfaces, such as walls, projection screens or a windshield of a vehicle. Additionally or alternatively, or may project an image directly onto the eyes of a user (e.g. via retinal projection).

I/O devices 222 may further include various sensors that generate sensor data corresponding to one or more objects included in an area being monitored. For example, sensors may include, without limitation, visual sensors (e.g., RGB cameras, infrared cameras, etc.), distance measurement sensors (e.g., LIDAR, radar), auditory sensors (e.g., microphones), and/or environment sensors (e.g., thermometers, etc.). Data from these sensors may be aggregated and analyzed together to generate meaningful information, warnings, recommendations, etc.

Processor 202 is included to be representative of a single central processing unit (CPU), multiple CPUs, a single CPU having multiple processing cores, and the like. And system memory 212 is generally included to be representative of a random access memory. Storage 204 may be a disk drive storage device. Although shown as a single unit, storage 204 may be a combination of fixed and/or removable storage devices, such as fixed disc drives, floppy disc drives, tape drives, removable memory cards, or optical storage, network attached storage (NAS), or a storage area-network (SAN). Processor 202 communicates to other computing devices and systems via network interface 208, where network interface 208 is configured to transmit and receive data via a communications network.

System memory 212 includes, without limitation, an operating system 232, a distributed message handler (DMH) module 234, and a data store 242. Operating system 232 and distributed message handler module 234, when executed by processor 202, perform one or more operations associated with distributed message handler device 102 of FIG. 1, as further described herein. When performing the operations associated with distributed message handler device 102, operating system 232 and distributed message handler module 234 may store data in and retrieve data from data store 242.

In operation, operating system 232 provides various support functions for distributed message handler device 102. Processor 202 is generally under the control of operating system 232. Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used.

In operation, distributed message handler module 234 exchanges data with distributed message handler device 102 in the form of messages. The messages may be formatted as shown below:
DMH service
Message Type
{(Sender<identifier>)
(Data:<values>)}

"DMH service" is an identifier that specifies the service associated with the message, such as "Conference Room Service." "Message Type" is an identifier that specifies the type of message. Message Type could be a trigger event to command distributed message handler device 102 to detect presence of persons or other objects, to detect angles of the persons or objects, or to detect gestures made by a person. Message Type could be a message that includes data regarding detected persons or other objects, angles of such persons or objects, or gestures made by a person. The "Sender" field includes an identifier that specifies the distributed message handler device 102 that is transmitting the message. The "Data" field that includes corresponding data values, based on the Message Type. The data may be in any technically feasible format that is conducive for transmitting messages over a communications network. In one example, message data may be formatted in JavaScript Object Notation (JSON). Additionally or alternatively, the messages may be in any technically feasible format. In general, the disclosed messages are significantly shorter in length than the original sensor data. Further, because the format of the messages is standardized across all distributed message handler device 102, the distributed message handler devices 102 are able to process the messages regardless of the particular format of the original sensor data.

In some embodiments, the data in a message may have several parts and may be nested in any technically feasible way. In one example, the message may be an object detection message. A first portion of the data may identify that two persons and three chairs are detected. A second portion of the data may list each individual person, where the data for each person includes certain features of the person, such as hair color, whether the person is wearing glasses, and whether the person is sitting or standing. A third portion of the data may list each individual chair, where the data for each chair includes certain features of the chair, such as the type of chair, the number of chair legs, and whether the chair is capable of reclining.

Distributed message handler module 234 begins executing when distributed message handler device 102 is powered on, when distributed message handler device 102 completes a boot sequence, when operating system 232 launches distributed message handler module 234, or the like. Distributed message handler module 234 transmits an election message in the form of a broadcast message to all devices in communication with communications network 130. The broadcast message specifies or "advertises" a particular service that distributed message handler device 102 is configured to provide. In one example, the service may be a conference room service that tracks persons and other objects in a conference room over a full 360 degree field of view. The service may adjust the beam width and sweet spot for one or more highly directional loudspeakers to direct certain audio signals at certain persons in the conference room. The service may turn microphones on in areas of the conference room where persons are detected, turn microphones off in areas of the conference room where no persons are detected, and adjust the sensitivity of microphones based on the distance between the microphones and the persons in the conference room. Additionally or alternatively, the service could track persons or objects over a smaller field of view, such as 90 degrees, 180 degrees, or 270 degrees. Additionally or alternatively, the service could track persons and objects in an open space, such as an auditorium or arena.

Distributed message handler module 234 receives broadcast messages from other distributed message handler devices 102 that advertise the same service as distributed message handler module 234. Distributed message handler module 234 then determines which distributed message handler devices 102 offering the service is to be elected as the coordinator for the distributed message handler devices 102. The distributed message handler device 102 that is to be the coordinator may be elected via any technically feasible techniques. The techniques include, without limitation, the distributed message handler device 102 with the longest uptime since being powered on, the highest or lowest media access control (MAC) address, the highest or lowest internet protocol (IP) address, and/or the like. The techniques could be used in combination. For example, the distributed message handler device 102 with the longest uptime could be selected as the coordinator. With this technique, two distributed message handler devices 102 may have exactly the same uptime, and the uptimes for all other distributed message handler devices 102 are lower. To break the tie, the distributed message handler device 102 that has a higher MAC address could be elected as the coordinator. Because all distributed message handler devices 102 offering the same service employ the same technique to elect a coordinator, all distributed message handler devices 102 elect the same coordinator.

Distributed message handler module 234 forms a private communications network with other distributed message handler devices 102 offering the same service. Distributed message handler module 234 communicates with these other distributed message handler devices 102 via one-to-many messages, also referred to herein as "multicast" messages. With multicast messaging, distributed message handler module 234 transmits multicast messages that are received by the other distributed message handler devices 102 that are within the private communications network. Other devices that are not within the private communications network do not receive the multicast messages.

If distributed message handler module 234 is executing on the distributed message handler device 102 that has been elected as the coordinator, then distributed message handler module 234 transmits messages to control the activities of the distributed message handler devices 102 within the private communications network. In particular, distributed message handler module 234 transmits a multipoint message in the form of a trigger event to command distributed message handler devices 102 to perform one or more types of analysis, detection and/or other appropriate actions, on sensor data received via one or more sensors of the respective distributed message handler device 102. For example, distributed message handler module 234 transmits a trigger event to command distributed message handler devices 102 to perform gesture detection, object detection, or angle detection.

Distributed message handler module 234 then receives sensor data via one or more sensors connected via I/O devices interface 206, such as a still or video camera. Distributed message handler module 234 extracts various features from the sensor data. For example, distributed message handler module 234 may detect one or more persons or other objects, such as chairs or tables that are present in the camera image. Further, distributed message handler module 234 may detect additional features of a detected object, such as the number of legs on a detected chair or whether a detected chair is capable of reclining. Distributed message handler module 234 extracts features that identify the number and type of objects that are detected. Similarly, distributed message handler module 234 may detect the angle of one or more persons or other objects, such as chairs or tables, relative to the camera. Distributed message handler module 234 extracts features that identify the angle of the objects that are detected. Distributed message handler module 234 may detect that a person in the camera image is performing a particular gesture. Distributed message handler module 234 extracts a feature that identifies the gesture being performed by the person. Distributed message handler module 234 then formats the extracted features into one or more messages and transmits the messages to the distributed message handler devices 102 in the private communications network.

If distributed message handler module 234 is executing on the distributed message handler device 102 that has been elected as the coordinator, then distributed message handler module 234 receives the messages from one or more distributed message handler devices 102 in the private communications network and stores the received messages in data store 242. If distributed message handler module 234 is anticipating that multiple distributed message handler devices 102 may be transmitting messages, then distributed message handler module 234 waits for a specified duration of time in order to allow all distributed message handler devices 102 sufficient time to gather sensor data, such as an image frame, process the sensor data, and transmit messages that identify features extracted from the sensor data. After, receiving messages from one or more distributed message handler devices 102, distributed message handler module 234 processes the received messages to determine one or more responsive actions. For example, distributed message handler module 234 may determine that distributed message handler devices 102 should stop performing a current mode of analysis, detection, or other action and start performing a different mode of analysis, detection, or other action. In response, distributed message handler module 234 may transmit one or more messages to command distributed message handler devices 102 to stop performing a current mode of analysis, detection, or other action and start performing a different mode of analysis, detection, or other action. Distributed message handler module 234 may determine that certain actions should be performed by one or more external devices, such as external device 106. Distributed message handler module 234 may transmit one or more messages to a set of highly directional loudspeakers. The messages may command the highly directional loudspeakers to increase or decrease a beam width or to change a direction of a beam emitted by the highly directional loudspeakers. Likewise, distributed message handler module 234 may transmit one or more messages to a set of microphones. The messages may command the highly directional loudspeakers to increase or decrease a sensitivity of the microphones or to turn certain microphones on or off.

In addition, if distributed message handler module 234 is executing on the distributed message handler device 102 that has been elected as the coordinator, then distributed message handler module 234 periodically transmits heartbeat messages to inform the other distributed message handler devices 102 in the private communications network that the coordinator is still operating.

If distributed message handler module 234 is executing on the distributed message handler device 102 that has not been elected as the coordinator, then distributed message handler module 234 receives the messages from one or more distributed message handler devices 102 in the private communications network and stores the received messages in data store 242. Distributed message handler module 234 does not perform any analysis on the received messages and does not transmit any responsive messages. Instead, distributed message handler module 234 maintains storage of the messages in case the current coordinator stops communicating with the private communications network.

In this regard, if distributed message handler module 234 stops receiving heartbeat messages from the coordinator for a threshold amount of time, then distributed message handler module 234 transmits an election message to initiate another coordinator election process. Likewise, all other distributed message handler devices 102 in the private communications network that are still operating also transmit an election message. Distributed message handler module 234, in conjunction with the other distributed message handler devices 102, then perform an election process to elect a subsequent coordinator. Because distributed message handler module 234 and each of the other distributed message handler devices 102 have separately maintained a data store of the received messages, any distributed message handler device 102 is capable of assuming the role of subsequent coordinator without any disruption in service.

The exchange of messages among distributed message handler devices 102 and external device 106 is now described.

Figure 3:
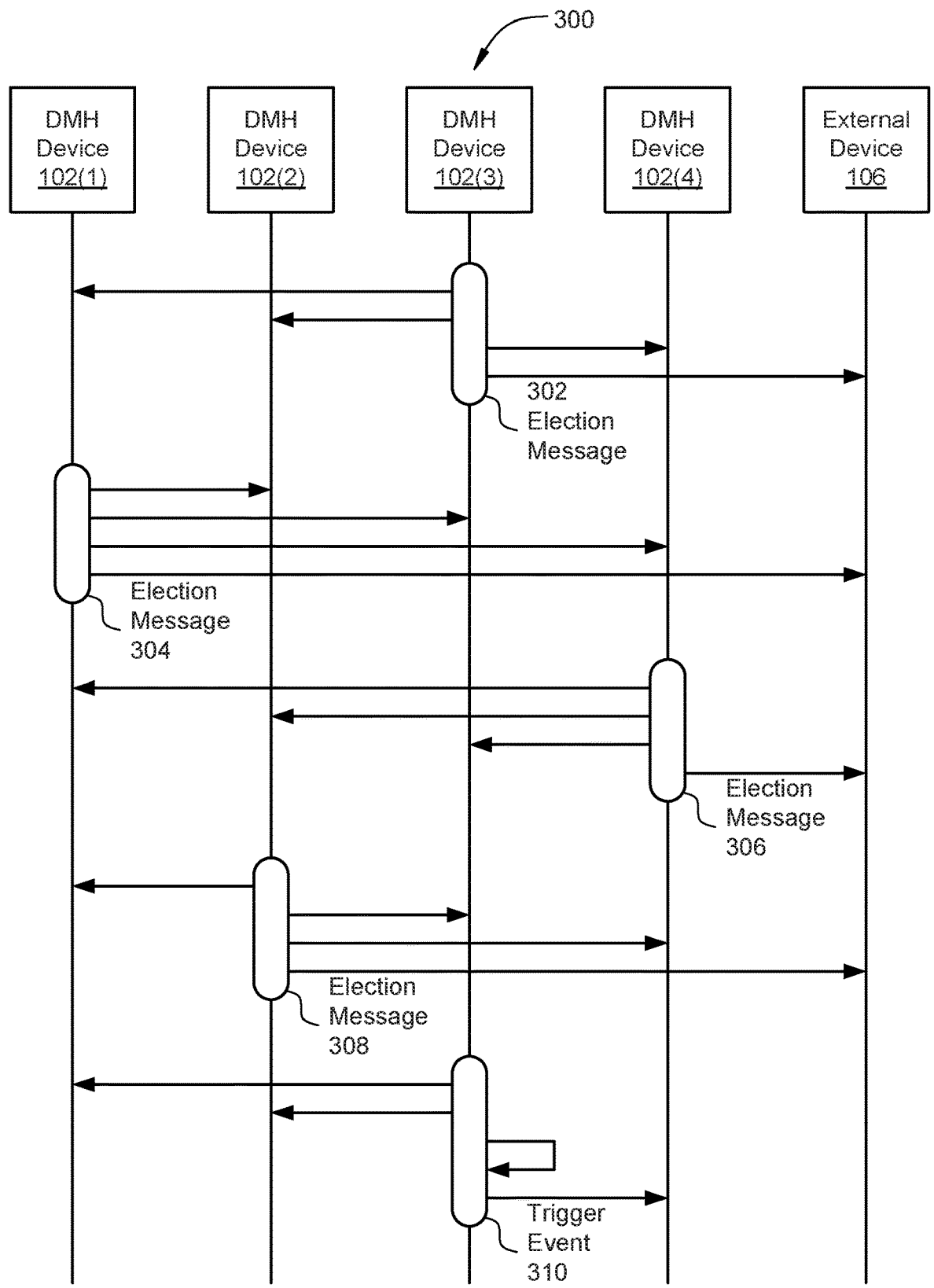
FIG. 3 illustrates a data flow sequence diagram for electing a distributed message handler device as an initial coordinator, according to various embodiments.

FIG. 3 illustrates a data flow sequence diagram 300 for electing a distributed message handler device as an initial coordinator, according to various embodiments. The data flow sequence diagram 300 may be implemented by the distributed message handler module 234 executing on a set distributed message handler devices 102 of FIG. 2. The data flow sequence diagram 300 illustrates messages exchanged among distributed message handler devices 102(1), 102(2), 102(3), and 102(4), and external device 106. The messages are transmitted chronologically from the top of the data flow sequence diagram 300 to the bottom of the data flow sequence diagram 300.

Each of distributed message handler devices 102(1), 102(2), 102(3), and 102(4) begins executing when distributed message handler device 102 is powered on, when distributed message handler device 102 completes a boot sequence, when operating system 232 launches distributed message handler module 234, or the like. Distributed message handler device 102(3) transmits an election message 302 as a broadcast message to all devices within the communications network, including, without limitation, distributed message handler devices 102(1), 102(2), and 102(4). The election message 302 may include an uptime that specifies the amount of time that distributed message handler device 102(3) has been powered on. Additionally or alternatively, the election message 302 may include a MAC address associated with distributed message handler device 102(3). Additionally or alternatively, the election message 302 may include an IP address associated with distributed message handler device 102(3). Additionally or alternatively, the election message 302 may include any other data associated with distributed message handler device 102(3) that is relevant to electing a coordinator. The election message 302 may be formatted as follows:

Conference Room Service
Election Message
{(Sender: DMH Device 102(3))
(Data: Uptime: <value>,
MAC Address: <value>,
IP Address: <value>)}

The election message 302 specifies that the DMH service is a conference room service and that the message type is an election message. The election message 302 specifies that the sender is distributed message handler device 102(3), and that the data includes the uptime, MAC address, and IP address associated with distributed message handler device 102(3).

Likewise, distributed message handler devices 102(1), 102(4), and 102(2) transmit election messages 304, 306, and 308, respectively. The format and content of election messages 304, 306, and 308 are functionally the same as election message 302. After all distributed message handler devices 102 have transmitted election messages, each of distributed message handler devices 102 determine which distributed message handler device 102 is to be elected as the coordinator. Because all distributed message handler devices 102 elect the coordinator via the same technique, all distributed message handler devices 102 elect the same distributed message handler device 102 to be coordinator. As shown, distributed message handler device 102(3) is elected as the coordinator. Correspondingly, distributed message handler device 102(3) transmits a trigger event message 310 to command all distributed message handler devices 102(1), 102(2), 102(3), and 102(4) to perform a particular type of analysis, detection, or other action. For example, distributed message handler device 102(3) may transmit a trigger event message 310 to command distributed message handler devices 102(1), 102(2), 102(3), and 102(4) to perform gesture detection to extract a feature from sensor data that corresponds to a particular gesture of interest. The trigger event message 310 may be formatted as follows:

Conference Room Service
Gesture Detection Trigger
{(Sender: DMH Coordinator Device 102(3))
(Data: Perform Gesture Detection: <on>)}

The trigger event message 310 specifies that the DMH service is a conference room service and that the message type is a gesture detection trigger message. The trigger event message 310 specifies that the sender is distributed message handler device 102(3), and that distributed message handler device 102(3) is the current coordinator. The trigger event message 310 commands distributed message handler devices 102 to perform gesture detection.

Each of distributed message handler devices 102(1), 102(2), 102(3) and 102(4) store the trigger event message 310 in a local data store. Distributed message handler devices 102(1), 102(2), 102(3), and 102(4) then exchange additional messages associated with the service, as now described.

Figure 4:
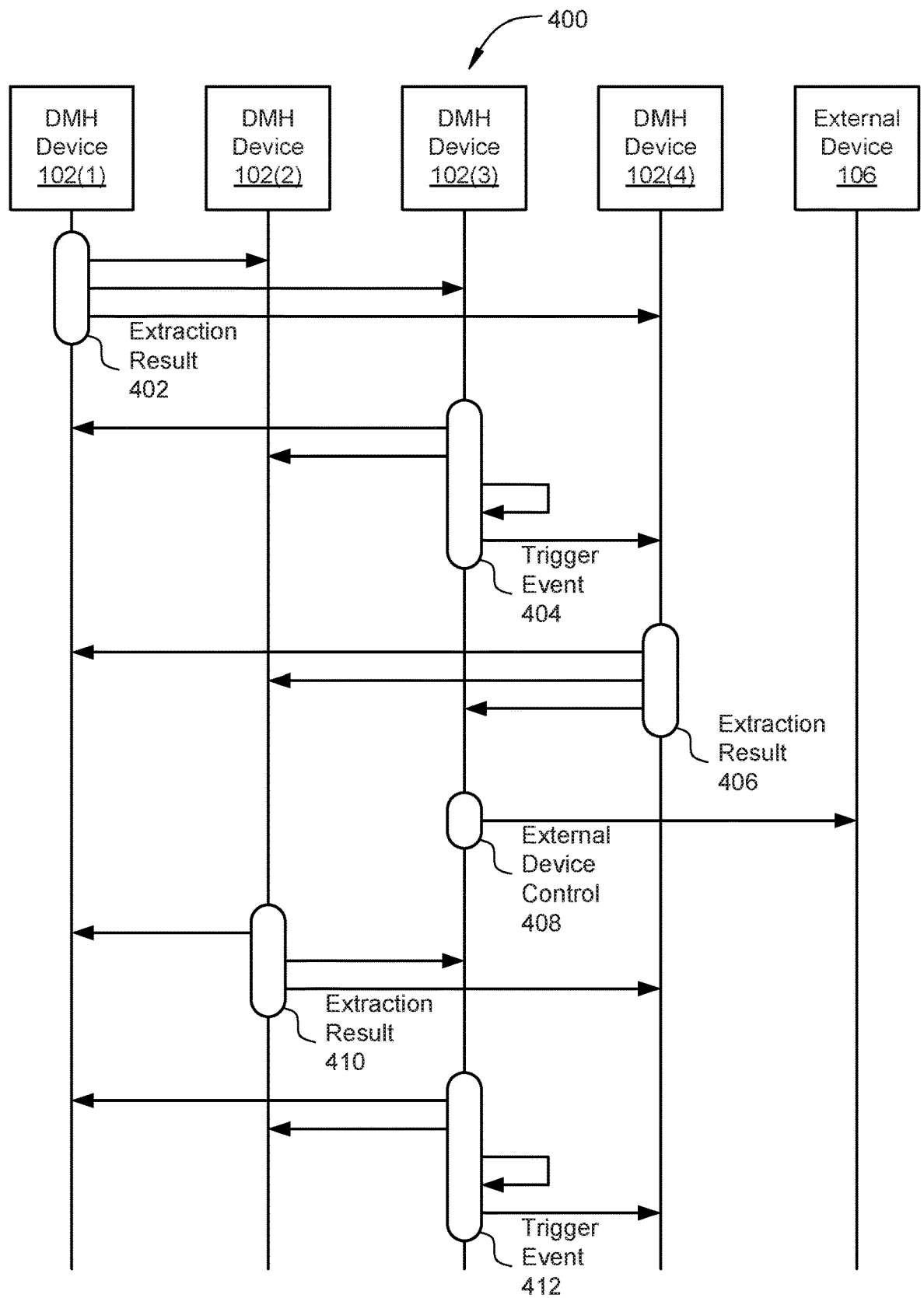
FIG. 4 illustrates a data flow sequence diagram for distributing event messages among a set of distributed message handler devices, according to various embodiments.

FIG. 4 illustrates a data flow sequence diagram 400 for distributing event messages among a set of distributed message handler devices, according to various embodiments. The data flow sequence diagram 400 may be implemented by the distributed message handler module 234 executing on a set of distributed message handler devices 102 of FIG. 2. The data flow sequence diagram 400 illustrates messages exchanged among distributed message handler devices 102(1), 102(2), 102(3), and 102(4), and external device 106. The messages are transmitted chronologically from the top of the data flow sequence diagram 400 to the bottom of the data flow sequence diagram 400.

As described in conjunction with FIG. 3, distributed message handler devices 102(1), 102(2), 102(3), and 102(4) perform a particular type of analysis, detection, or other action as specified by trigger event message 310. As shown in FIG. 4, distributed message handler device 102(1) may transmit an extraction result message 402 that includes data regarding one or more features that distributed message handler device 102(1) extracts from image data. Distributed message handler device 102(1) may transmit an extraction result message 402 to distributed message handler devices 102(2), 102(3), and 102(4). Each of distributed message handler devices 102(1), 102(2), 102(3) and 102(4) store the extraction result message 402 in a local data store. The extraction result message 402 may include data related to a gesture feature that distributed message handler device 102(1) detects within an image. The extraction result message 402 may be formatted as follows:

Conference Room Service
Gesture Detection Extraction Result
{(Sender: DMH Device 102(1))
(Data: Gesture Detection: gesture A detected)}

The extraction result message 402 specifies that the DMH service is a conference room service and that the message type is a gesture detection extraction result. The extraction result message 402 specifies that the sender is distributed message handler device 102(1). The extraction result message 402 indicates that distributed message handler device 102(1) has detected a gesture of type A.

In response, distributed message handler devices 102(1), 102(2), 102(3), and 102(4) store the extraction result message 402. Distributed message handler device 102(3) determines that the gesture A identified by extraction result message 402 is a gesture to perform object and/or angle detection. Therefore, distributed message handler device 102(3) transmits a trigger event message 404 to command all distributed message handler devices 102(1), 102(2), 102(3), and 102(4) to perform a particular type of analysis, detection, or other action. For example, distributed message handler device 102(3) may transmit a trigger event message 404 to command distributed message handler devices 102 (1), 102(2), 102(3), and 102(4) to perform object and/or angle detection to extract a feature from sensor data that corresponds to a particular object of interest. The trigger event message 404 may be formatted as follows:

Conference Room Service
Object/Angle Detection Trigger
{(Sender: DMH Coordinator Device 102(3))
(Data: Perform Object/Angle Detection: <on>)}

The trigger event message 404 specifies that the DMH service is a conference room service and that the message type is an object/angle detection trigger message. The trigger event message 404 specifies that the sender is distributed message handler device 102(3), and that distributed message handler device 102(3) is the current coordinator. The trigger event message 404 commands distributed message handler devices 102 to perform object and/or angle detection. Each of distributed message handler devices 102(1), 102(2), 102 (3) and 102(4) store the trigger event message 404 in a local data store.

Distributed message handler device 102(4) may transmit an extraction result message 402 that includes data regarding one or more features that distributed message handler device 102(1) extracts from image data. Distributed message handler device 102(4) may transmit an extraction result message 402 to distributed message handler devices 102(1), 102(2), and 102(3). Each of distributed message handler devices 102(1), 102(2), 102(3) and 102(4) store the extraction result message 406 in a local data store. The extraction result message 406 may include data related to an object feature that distributed message handler device 102(1) detects within an image. The extraction result message 406 may be formatted as follows:

Conference Room Service
Object/Angle Detection Extraction Result
{(Sender: DMH Device 102(4))
(Data: Object Detection: <Person>,
Object Angle: <value>)}

The extraction result message 406 specifies that the DMH service is a conference room service and that the message type is an object/angle detection extraction result. The extraction result message 406 specifies that the sender is distributed message handler device 102(4). The extraction result message 406 indicates that distributed message handler device 102(4) has detected an object of interest and specifies the angle of the object relative to distributed message handler device 102(4).

In response, distributed message handler devices 102(1), 102(2), 102(3), and 102(4) store the extraction result message 406. Distributed message handler device 102(3) combines data from extraction result message 406 with extraction result messages received from other distributed message handler devices 102 to determine the location of a person that is present in the room. In response, distributed message handler device 102(3) transmits an external device control message 408 to external device 106.

In one example, external device 106 may be a highly directional loudspeaker. Distributed message handler device 102(3) may transmit the external device control message 408 to the highly directional loudspeaker to adjust the beam width and direction of an audio signal such that the detected person is able to hear the audio signal while other persons do not hear the audio signal. In this example, the external device control message 408 may be formatted as follows:

External Device Control Message
(Data: Beam Width: <value>,
Direction: <value>)

The external device control message 408 specifies that the message type is an external device control message. The external device control message 408 commands external device 106 to adjust the beam width and direction of an audio signal to specified values.

In another example, external device 106 may be a microphone. If the microphone is in an area of the room where no person is detected, then distributed message handler device 102(3) may transmit the external device control message 408 to the microphone to turn the microphone off. If, on the other hand, the microphone is in an area of the room where a person is detected, then distributed message handler device 102(3) may transmit the external device control message 408 to the microphone to turn the microphone on. In this latter case, the external device control message 408 may further adjust the sensitivity of the microphone based on a distance between the microphone and the detected person. The external device control message 408 may be formatted as follows:

External Device Control Message
(Data: Microphone: <on>,
 Sensitivity: <value>)

The external device control message 408 specifies that the message type is an external device control message. The external device control message 408 commands external device 106 to turn the microphone on and to adjust the sensitivity of the microphone to the specified value.

Subsequently, distributed message handler device 102(2) may transmit an extraction result message 410 that includes data regarding one or more features that distributed message handler device 102(2) extracts from image data. Distributed message handler device 102(2) may transmit an extraction result message 410 to distributed message handler devices 102(1), 102(3), and 102(4). Each of distributed message handler devices 102(1), 102(2), 102(3) and 102(4) store the extraction result message 410 in a local data store. The extraction result message 410 may include data related to a gesture feature that distributed message handler device 102(2) detects within an image. The extraction result message 410 may be formatted as follows:

Conference Room Service
Gesture Detection Extraction Result
 {(Sender: DMH Device 102(2))
  (Data: Gesture Detection: gesture B detected)}

The extraction result message 410 specifies that the DMH service is a conference room service and that the message type is a gesture detection extraction result. The extraction result message 410 specifies that the sender is distributed message handler device 102(2). The extraction result message 410 indicates that distributed message handler device 102(2) has detected a gesture B of interest.

In response, distributed message handler devices 102(1), 102(2), 102(3), and 102(4) store the extraction result message 410. Distributed message handler device 102(3) determines that the gesture identified by extraction result message 410 is a gesture to stop performing object and/or angle detection. Therefore, distributed message handler device 102(3) transmits a trigger event message 412 to command all distributed message handler devices 102(1), 102(2), 102(3), and 102(4) to stop performing a particular type of analysis, detection, or other action. For example, distributed message handler device 102(3) may transmit a trigger event message 412 to command distributed message handler devices 102(1), 102(2), 102(3), and 102(4) to stop performing object and/or angle detection. The trigger event message 412 may be formatted as follows:

Conference Room Service
Object/Angle Detection Trigger
 {(Sender: DMH Coordinator Device 102(3))
  (Data: Perform Object/Angle Detection: <off>)}

The trigger event message 412 specifies that the DMH service is a conference room service and that the message type is an object/angle detection trigger message. The trigger event message 412 specifies that the sender is distributed message handler device 102(3), and that distributed message handler device 102(3) is the current coordinator. The trigger event message 412 commands distributed message handler devices 102 to stop performing object and/or angle detection. Each of distributed message handler devices 102(1), 102(2), 102(3) and 102(4) store the trigger event message 404 in a local data store. Distributed message handler devices 102(1), 102(2), 102(3) and 102(4) then stop performing object and/or angle detection.

Figure 5:
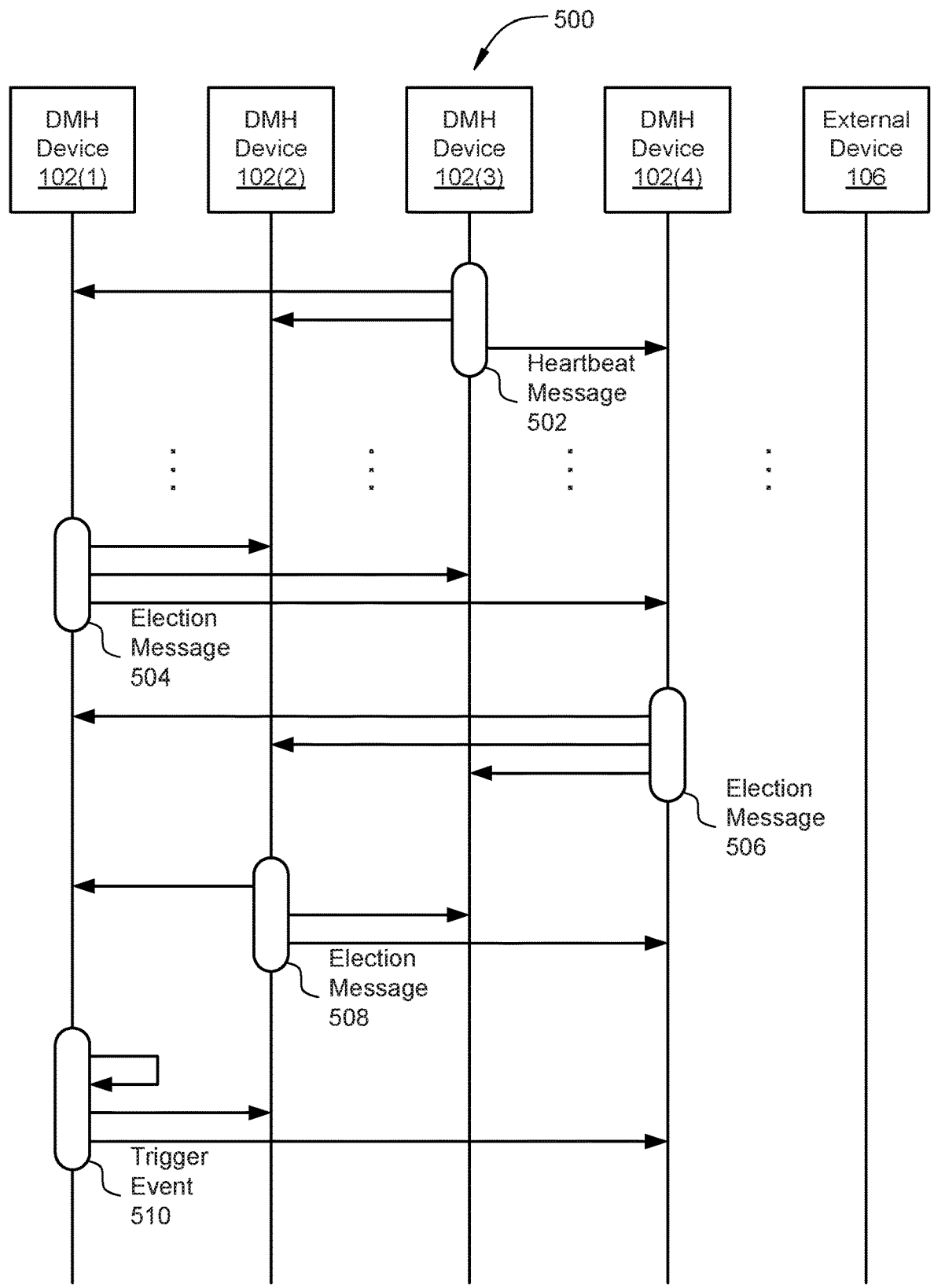
FIG. 5 illustrates a data flow sequence diagram for electing a distributed message handler device as a subsequent coordinator, according to various embodiments.

FIG. 5 illustrates a data flow sequence diagram 500 for electing a distributed message handler device as a subsequent coordinator, according to various embodiments. The data flow sequence diagram 500 may be implemented by the distributed message handler module 234 executing on a set of distributed message handler devices 102 of FIG. 2. The data flow sequence diagram 500 illustrates messages exchanged among distributed message handler devices 102(1), 102(2), 102(3), and 102(4), and external device 106. The messages are transmitted chronologically from the top of the data flow sequence diagram 500 to the bottom of the data flow sequence diagram 500.

As shown, distributed message handler device 102(3) is the current coordinator. Because distributed message handler device 102(3) is the current coordinator, distributed message handler device 102(3) transmits heartbeat messages, such as heartbeat message 502, at periodic intervals. The heartbeat message 502 may be formatted as follows:

Conference Room Service
Heartbeat Message
 {(Sender: DMH Coordinator Device 102(3))
  (Data: Heartbeat: <on>)}

The heartbeat message 502 specifies that the DMH service is a conference room service and that the message type is a heartbeat message. The heartbeat message 502 specifies that the sender is distributed message handler device 102(3), and that distributed message handler device 102(3) is the current coordinator. Sometime after transmitting heartbeat message 502, distributed message handler device 102(3) stops communicating with the other distributed message handler devices 102. Subsequently, distributed message handler devices 102(1), 102(2), and 102(4) determine that distributed message handler device 102(3) is no longer transmitting heartbeat messages. In so doing, distributed message handler devices 102(1), 102(2), and 102(4) may determine that distributed message handler device 102(3) has not transmitted a heartbeat message for a specified duration of time. Additionally or alternatively, distributed message handler devices 102(1), 102(2), and 102(4) may determine that distributed message handler device 102(3) has failed to transmit a heartbeat message for a specified number of times.

Upon determining that distributed message handler device 102(3) is no longer transmitting heartbeat messages, distributed message handler devices 102(1), 102(2), and 102(4) initiate an election process to elect a subsequent coordinator. In so doing, distributed message handler devices 102(1), 102(4), and 102(2) transmit election messages 504, 506, and 508, respectively. The format and content of election messages 504, 506, and 508 are functionally the same as election messages 302, 304, 306, and 308. Distributed message handler devices 102(1), 102(4), and 102(2) perform an election process, as described herein, to elect a subsequent coordinator. As shown, distributed message handler device 102(1) is elected as the coordinator. Correspondingly, distributed message handler device 102(1) transmits a trigger event 510 to command all remaining distributed message handler devices 102(1), 102(2), and 102(4) to perform a particular type of analysis, detection, or other action. Distributed message handler devices 102(1), 102(2), and 102(4) continue to provide the conference room service without disruption.

It will be appreciated that the data flow sequence diagrams shown herein are illustrative and that variations and modifications are possible. In this regard, the various messages may be transmitted in any technically feasible chronological order. In one example, as shown in FIG. 3, distributed message handler devices 102(3), 102(1), 102(4), and 102(2) may transmit election messages 302, 304, 306, and 308 in any technically feasible chronological order. Similarly, as shown in FIG. 5, distributed message handler devices 102(1), 102(4), and 102(2) may transmit election messages 504, 506, and 508 in any technically feasible chronological order. In another example, as shown in FIG. 4, distributed message handler 102(3) may transmit external device control message 408 to external device 106 after distributed message handler 102(2) transmits extraction result message 410 to distributed message handler devices 102(1), 102(3), and 102(4) and after distributed message handler 102(3) transmits trigger event message 412 to distributed message handler devices 102(1), 102(2), 102(3), and 102(4).

Figure 6A:
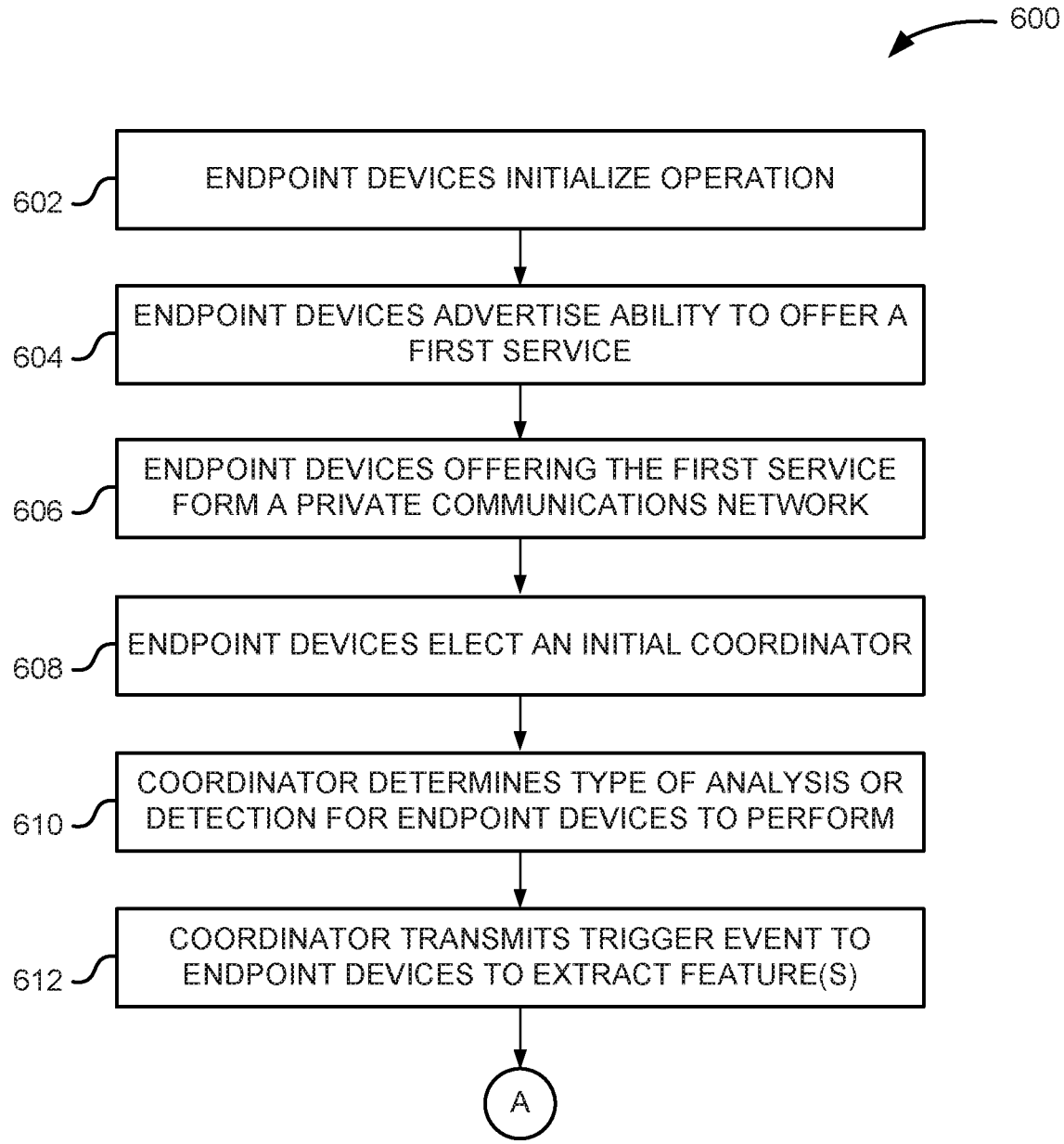
FIGS. 6A-6B set forth a flow diagram of method steps for managing a set of distributed message handler devices included in an internet of things architecture, according to various embodiments.
Figure 6B:
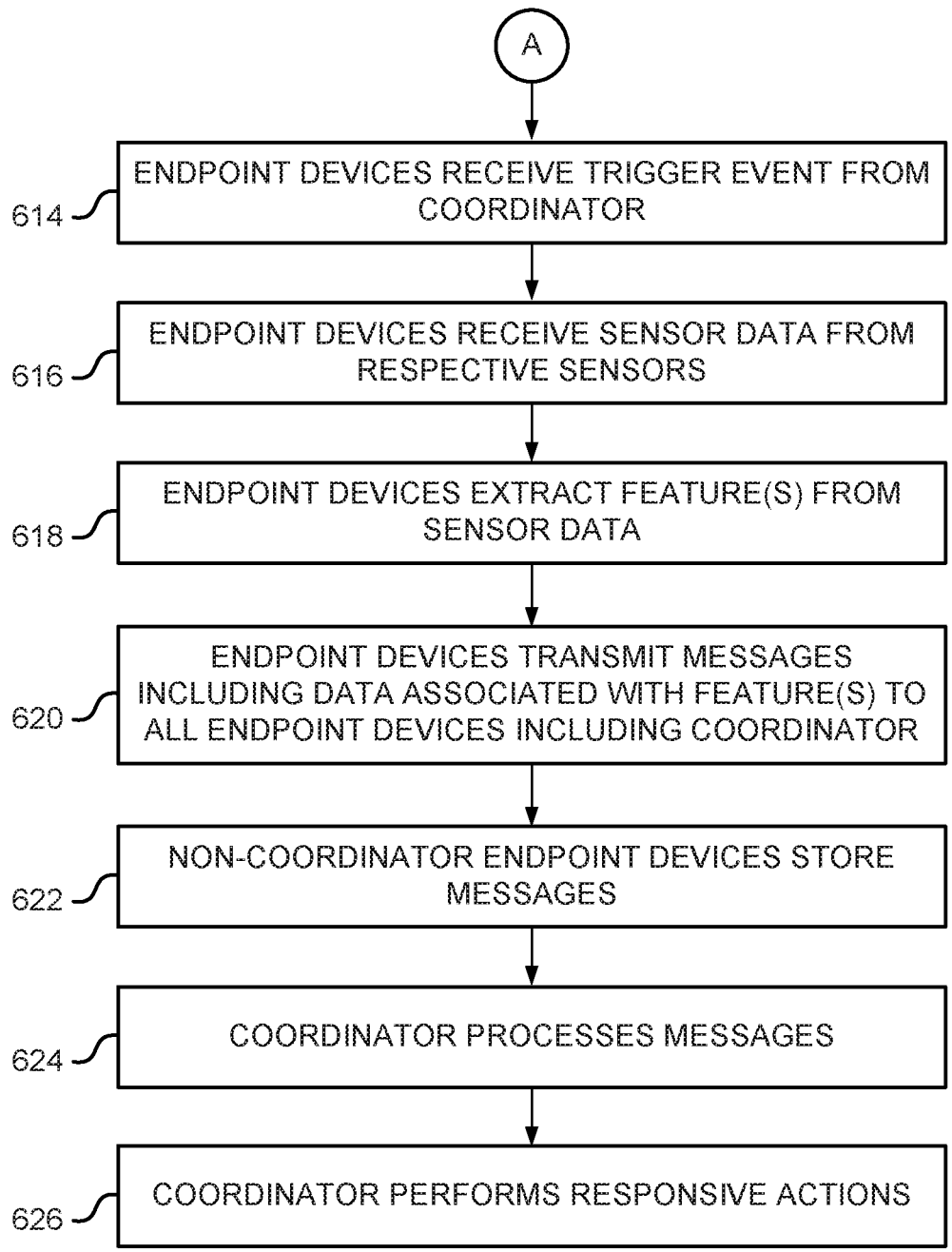

FIGS. 6A-6B set forth a flow diagram of method steps for managing a set of distributed message handler devices included in an internet of things architecture, according to various embodiments. Although the method steps are described in conjunction with the systems of FIGS. 1-5, persons skilled in the art will understand that any system configured to perform the method steps, in any order, is within the scope of the present disclosure.

As shown, a method 600 begins at step 602, where an application program executing on multiple endpoint devices initializes operation. The application program may be distributed message handler module 234 executing on one of the distributed message handler devices 102 of FIG. 1. A distributed message handler device 102 may initialize operation when distributed message handler device 102 is powered on, when distributed message handler device 102 completes a boot sequence, when operating system 232 launches distributed message handler module 234, or the like.

At step 604, distributed message handler devices 102 advertise the ability to offer a first service. The first service may be a conference room service that tracks persons and other objects in a conference room over a full 360 degree field of view. Distributed message handler devices 102 advertise the first service via a broadcast message to all devices on the communications network.

At step 606, distributed message handler devices 102 that are offering the first service form a private communications network. Specifically, each distributed message handler device 102 identifies the set of distributed message handler devices 102 that advertise the first service. Distributed message handler devices 102 then transmit messages to each other via multicast messages that are transmitted to distributed message handler devices 102 in the private communications network that offer the first service, but are not transmitted to other devices. The messages are functionally similar to election messages 302, 304, 306, and 308 of FIG. 3.

At step 608, distributed message handler devices 102 elect an initial coordinator. The distributed message handler device 102 elected as the initial coordinator may be the distributed message handler device 102 with the longest uptime since being powered on, the highest or lowest media access control (MAC) address, the highest or lowest internet protocol (IP) address, and the like.

At step 610, the coordinator determines a type of analysis or detection for distributed message handler devices 102 to perform. The type of analysis or detection may include, without limitation, gesture detection, object detection, or angle detection. At step 612, the coordinator transmits a trigger event to distributed message handler devices 102 to extract certain features from sensor data available to distributed message handler device 102. The trigger event is functionally similar to trigger event message 310 of FIG. 3 and trigger event messages 404 and 412 of FIG. 4.

At step 614, distributed message handler devices 102 receive the trigger event from the coordinator.

At step 616, distributed message handler devices 102 receive sensor data from respective sensors. The sensor data may include, without limitation, image data from still and/or video cameras. At step 618, the distributed message handler devices 102 extract one or more features from the sensor data. In one example, the feature may identify a gesture being performed by a person. In another example, the feature may identify an object present in the image data and/or an angle of the object with respect to the camera.

At step 620, each distributed message handler device 102 that has detected one or more features transmit messages that include corresponding data to the all distributed message handler devices 102 including the coordinator. The messages are functionally similar to extraction result messages 402, 406, and 410 of FIG. 4. At step 622, distributed message handler devices 102 that are non-coordinator devices store the received messages. At step 624, the coordinator processes the received messages. In one example, the coordinator receives object and/or angle detection messages from multiple distributed message handler devices 102. In response, the coordinator determines the location of one or more persons and other objects in an area. At step 636, the coordinator performs one or more responsive actions. The responsive actions may include determining that distributed message handler devices 102 should stop performing a current type of analysis or detection and start performing a different type of analysis or detection. Additionally or alternatively, the responsive actions may include transmitting messages to one or more external devices, such as external device 106, in order to control features or characteristics of the external devices. The messages are functionally similar to external device control message 408 of FIG. 4.

The method 600 then terminates. Alternatively, the method 600 proceeds to step 610, described above, where distributed message handler devices 102 perform additional processing of sensor data.

Figure 7:
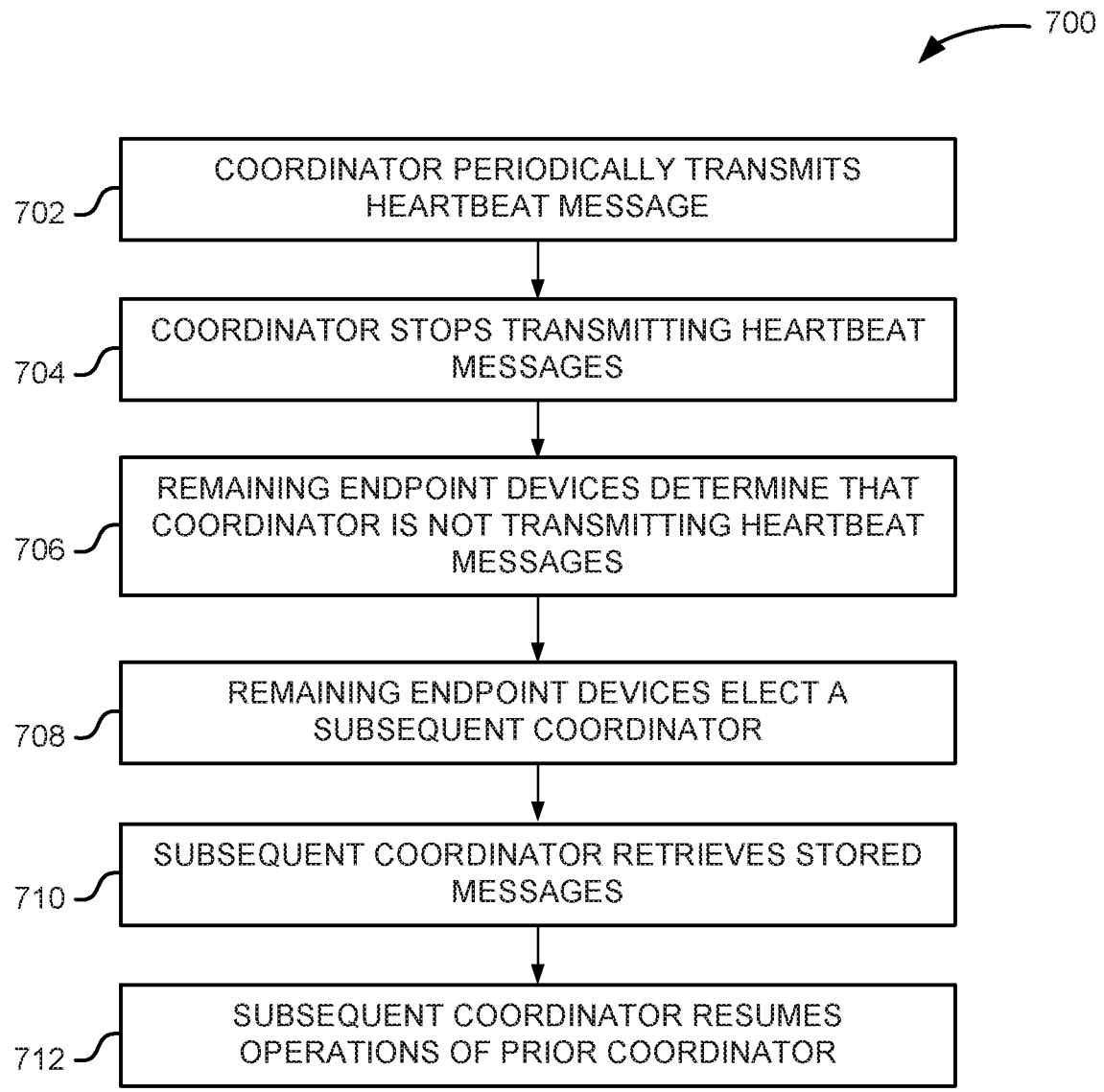
FIG. 7 is a flow diagram of method steps for electing a subsequent coordinator in an internet of things architecture, according to various embodiments.

FIG. 7 is a flow diagram of method steps for electing a subsequent coordinator in an internet of things architecture, according to various embodiments. Although the method steps are described in conjunction with the systems of FIGS. 1-5, persons skilled in the art will understand that any system configured to perform the method steps, in any order, is within the scope of the present disclosure.

As shown, a method 700 begins at step 702, where an application program executing on an endpoint device that is currently selected as the coordinator periodically transmits heartbeat messages to the other endpoint devices. The messages are functionally similar to heartbeat message 502 of FIG. 5. The application program may be distributed message handler module 234 executing on one of the distributed message handler devices 102 of FIG. 1. At step 704, the coordinator stops transmitting heartbeat messages. For example, the coordinator may stop communicating with device message handler devices 102 due to power loss, system failure, and the like.

At step 706, the remaining distributed message handler devices 102 determine that the coordinator is not transmitting heartbeat messages. Distributed message handler devices 102 may determine that the coordinator has not transmitted a heartbeat message for a specified duration of time. Additionally or alternatively, distributed message handler devices 102 may determine that the coordinator has failed to transmit a heartbeat message for a specified number of times.

At step 708, the remaining distributed message handler devices 102 elect a subsequent coordinator. In so doing, the remaining distributed message handler devices 102 may transmit messages to each other that are functionally similar to election messages 504, 506, and 508 of FIG. 5. The distributed message handler device 102 elected as the subsequent coordinator may be the distributed message handler device 102 with the longest uptime since being powered on, the highest or lowest MAC address, the highest or lowest IP address, and the like. At step 710, the subsequent coordinator retrieves the stored messages that were received from other distributed message handler devices 102. The stored messages provide the context needed for the elected distributed message handler device 102 to assume the role of coordinator. At step 712, the distributed message handler device 102 elected as the subsequent coordinator resumes operations of the prior coordinator. In so doing, the subsequent coordinator transmits messages that are functionally similar to trigger event message 510 of FIG. 5. The method 700 then terminates.

In sum, multiple endpoint devices, such as device message handler devices, are equipped with sensors to acquire sensor data. The endpoint devices communicate with each other over a private distributed communications network in order to transmit, receive, and process sensor-related data in a scalable manner. The endpoint devices communicate with each other by passing data as messages or objects over the private communications network, where the messages or objects are agnostic as to the type of endpoint devices or corresponding sensors. The set of endpoint devices are self-sufficient and do not require a designated central server to process the sensor data. More specifically, the endpoint devices form a private communications network, where any endpoint device connected to the private communications network is capable of serving as the coordinator of the analysis and/or detection performed by the endpoint devices and any responsive actions that are to take place. Further, if the current coordinator fails or otherwise stops communicating with the private communications network, the remaining endpoint devices elect one of the remaining endpoint devices as the subsequent coordinator. The subsequent coordinator assumes the activities of the prior coordinator without disruption of the service.

At least one technical advantage of the disclosed techniques relative to the prior art is that the endpoint devices in a distributed system transmit less sensor data relative to conventional approaches. Rather than transmitting raw sensor data to a remote data aggregator or cloud server, each endpoint device extracts one or more features represented by the sensor data. Each endpoint device transmits messages including data associated with the extracted features rather than the raw sensor data to the other endpoint devices on the local communications network. As a result, the amount of data transmitted via the communications network may be significantly reduced. Similarly, the processing power needed to process the messages may be significantly less than the processing power needed to process the raw sensor data. Further, the endpoint device designated as the coordinator determines the type of analysis that the endpoint devices perform at any given time, leading to reduced processing requirements for the endpoint devices. As a result, the latency of the distributed system is lower and the performance of the distributed system is higher relative to conventional approaches.

Another advantage of the disclosed techniques is that, when the endpoint device designated as the coordinator fails, the remaining endpoint devices automatically elect a new coordinator from among the remaining endpoint devices. As a result, the distributed system is resilient to endpoint device failure, leading to a more robust distributed system relative to prior approaches. These technical advantages represent one or more technological advancements over prior art approaches.

1. In some embodiments, a computer-implemented method for processing sensor data by a first endpoint device of a plurality of endpoint devices comprises: receiving first sensor data via a first sensor; receiving, from a first coordinator, a command to perform a first operation, the first coordinator being selected from the plurality of endpoint devices that includes the first endpoint device; in response to receiving the command, performing the first operation to extract a first feature from the first sensor data; and transmitting a first message that includes data associated with the first feature to the plurality of endpoint devices.

2. The computer-implemented method according to clause 1, wherein the first operation comprises detecting gestures and further comprising: detecting a first gesture within a first image included in the first sensor data, wherein the data associated with the first feature specifies that the first gesture has been detected.

3. The computer-implemented method according to clause 1 or clause 2, further comprising, in response to transmitting the first message, receiving, from the first coordinator, a second command to perform a second operation to extract a second feature from the first sensor data.

4. The computer-implemented method according to any of clauses 1-3, wherein the second operation comprises at least one of detecting presence of an object within a second image included in the first sensor data or detecting an angle associated with the object within the second image.

5. The computer-implemented method according to any of clauses 1-4, wherein the first operation comprises detecting presence of an object and further comprising: detecting a first object within a first image included in the first sensor data, wherein the data associated with the first feature specifies that the first object has been detected.

6. The computer-implemented method according to any of clauses 1-5, wherein the first operation comprises detecting an angle associated with an object and further comprising: detecting a first angle of an object within a first image included in the first sensor data, wherein the data associated with the first feature specifies that the first angle has been detected.

7. The computer-implemented method according to any of clauses 1-6, further comprising: determining that a coordinator has not been selected from among the plurality of endpoint devices; transmitting a second message that specifies a first parameter of the first endpoint device; receiving, from a second endpoint device included in the plurality of endpoint devices, a third message that specifies a second parameter of the second endpoint device; and determining whether the first endpoint device is the first coordinator based on the first parameter and the second parameter.

8. The computer-implemented method according to any of clauses 1-7, wherein the first parameter comprises at least one of a duration of time since the first endpoint device was powered on, a media access control (MAC) address associated with the first endpoint device, or an internet protocol (IP) address associated with the first endpoint device.

9. The computer-implemented method according to any of clauses 1-8, further comprising: determining, by the first endpoint device, that the first parameter and the second parameter are equal; and comparing, by the first endpoint device, a third parameter of the first endpoint device with a fourth parameter of the second endpoint device, wherein determining whether the first endpoint device is the first coordinator is further based on the third parameter and the fourth parameter.

10. The computer-implemented method according to any of clauses 1-9, wherein the first endpoint device is the first coordinator.

11. The computer-implemented method according to any of clauses 1-10, further comprising: in response to determining that the first coordinator has not transmitted a heartbeat message for a threshold duration of time, transmitting a fourth message that specifies a third parameter of the first endpoint device; receiving, from a third endpoint device included in the plurality of endpoint devices, a fifth message that specifies a fourth parameter of the third endpoint device; and determining whether the first endpoint device is a second coordinator based on the third parameter and the fourth parameter.

12. In some embodiments, one or more computer-readable storage media include instructions that, when executed by one or more processors, cause the one or more processors to process sensor data by a first endpoint device of a plurality of endpoint devices, by performing the steps of: receiving first sensor data via a first sensor; receiving, from a first coordinator, a command to perform a first operation, the first coordinator being selected from the plurality of endpoint devices that includes the first endpoint device; in response to receiving the command, performing the first operation to extract a first feature from the first sensor data; and transmitting a first message that includes data associated with the first feature to the plurality of endpoint devices, wherein the first message comprises a multipoint message.

13. The one or more computer-readable storage media according to clause 12, wherein the first operation comprises detecting gestures and wherein the instructions further cause the one or more processors to perform the step of: detecting a first gesture within a first image included in the first sensor data, wherein the data associated with the first feature specifies that the first gesture has been detected.

14. The one or more computer-readable storage media according to clause 12 or clause 13, wherein the instructions further cause the one or more processors to perform the step of, in response to transmitting the first message, receiving, from the first coordinator, a second command to perform a second operation to extract a second feature from the first sensor data.

15. The one or more computer-readable storage media according to any of clauses 12-14, wherein the second operation comprises at least one of detecting presence of an object within a second image included in the first sensor data or detecting an angle associated with the object within the second image.

16. The one or more computer-readable storage media cording to any of clauses 12-15, wherein the first operation comprises detecting presence of an object and wherein the instructions further cause the one or more processors to perform the step of: detecting a first object within a first image included in the first sensor data, wherein the data associated with the first feature specifies that the first object has been detected.

17. The one or more computer-readable storage media cording to any of clauses 12-16, wherein the first operation comprises detecting an angle associated with an object and wherein the instructions further cause the one or more processors to perform the step of: detecting a first angle of an object within a first image included in the first sensor data, wherein the data associated with the first feature specifies that the first angle has been detected.

18. The one or more computer-readable storage media cording to any of clauses 12-17, wherein the instructions further cause the one or more processors to perform the steps of: determining that a coordinator has not been selected from among the plurality of endpoint devices; transmitting a second message that specifies a first parameter of the first endpoint device; receiving, from a second endpoint device included in the plurality of endpoint devices, a third message that specifies a second parameter of the second endpoint device; and determining whether the first endpoint device is the first coordinator based on the first parameter and the second parameter.

19. The one or more computer-readable storage media cording to any of clauses 12-18, wherein the first parameter comprises at least one of a duration of time since the first endpoint device was powered on, a media access control (MAC) address associated with the first endpoint device, or an internet protocol (IP) address associated with the first endpoint device.

20. In some embodiments, a first endpoint device comprises: a memory that includes instructions; and a processor that is coupled to the memory and, when executing the instructions: receives first sensor data via a first sensor; receives, from a first coordinator, a command to perform a first operation, the first coordinator being selected from a plurality of endpoint devices that includes the first endpoint device, wherein each endpoint device included in the plurality of endpoint devices are in communication via a communications network; in response to receiving the command, performs the first operation to extract a first feature from the first sensor data; and transmits a first message that includes data associated with the first feature to the plurality of endpoint devices.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for processing sensor data by a first endpoint device of a plurality of endpoint devices, comprising:
   receiving, at the first endpoint device, first sensor data via a first sensor of the first endpoint device;
   receiving, from a first coordinator, a command to perform a first operation, the first coordinator being selected from the plurality of endpoint devices that includes the first endpoint device;
   in response to receiving the command, performing, at the first endpoint device, the first operation to extract a first feature from the first sensor data;
   transmitting, from the first endpoint device, a first message that includes data associated with the first feature to the plurality of endpoint devices; and
   receiving, at the first endpoint device, a second command from the first coordinator to perform a second operation to extract a second feature from the first sensor data, wherein the second operation comprises a different type of operation than the first operation.

2. The computer-implemented method of claim 1, wherein the first operation comprises detecting gestures and further comprising:
   detecting a first gesture within a first image included in the first sensor data, wherein the data associated with the first feature specifies that the first gesture has been detected.

3. The computer-implemented method of claim 1, wherein the second operation comprises at least one of detecting presence of an object within a second image included in the first sensor data or detecting an angle associated with the object within the second image.

4. The computer-implemented method of claim 1, wherein the first operation comprises detecting presence of an object and further comprising:
   detecting a first object within a first image included in the first sensor data, wherein the data associated with the first feature specifies that the first object has been detected.

5. The computer-implemented method of claim 1, wherein the first operation comprises detecting an angle associated with an object and further comprising:
   detecting a first angle of the object within a first image included in the first sensor data, wherein the data associated with the first feature specifies that the first angle has been detected.

6. The computer-implemented method of claim 1, further comprising:
   determining that a coordinator has not been selected from among the plurality of endpoint devices;
   transmitting a second message that specifies a first parameter of the first endpoint device;
   receiving, from a second endpoint device included in the plurality of endpoint devices, a third message that specifies a second parameter of the second endpoint device; and
   determining whether the first endpoint device is the first coordinator based on the first parameter and the second parameter.

7. The computer-implemented method of claim 6, wherein the first parameter comprises at least one of a duration of time since the first endpoint device was powered on, a media access control (MAC) address associated with the first endpoint device, or an internet protocol (IP) address associated with the first endpoint device.

8. The computer-implemented method of claim 6, further comprising:
   determining, by the first endpoint device, that the first parameter and the second parameter are equal; and
   comparing, by the first endpoint device, a third parameter of the first endpoint device with a fourth parameter of the second endpoint device, wherein determining whether the first endpoint device is the first coordinator is further based on the third parameter and the fourth parameter.

9. The computer-implemented method of claim 1, wherein the first endpoint device is the first coordinator.

10. The computer-implemented method of claim 1, further comprising:
in response to determining that the first coordinator has not transmitted a heartbeat message for a threshold duration of time, transmitting a fourth message that specifies a third parameter of the first endpoint device;
receiving, from a third endpoint device included in the plurality of endpoint devices, a fifth message that specifies a fourth parameter of the third endpoint device; and
determining whether the first endpoint device is a second coordinator based on the third parameter and the fourth parameter.

11. One or more non-transitory computer-readable storage media including instructions that, when executed by one or more processors, cause the one or more processors to process sensor data by a first endpoint device of a plurality of endpoint devices, by performing the steps of:
receiving, at the first endpoint device, first sensor data via a first sensor of the first endpoint device;
receiving, from a first coordinator, a command to perform a first operation, the first coordinator being selected from the plurality of endpoint devices that includes the first endpoint device;
in response to receiving the command, performing, at the first endpoint device, the first operation to extract a first feature from the first sensor data;
transmitting, from the first endpoint device, a first message that includes data associated with the first feature to the plurality of endpoint devices, wherein the first message comprises a multipoint message; and
receiving, at the first endpoint device, a second command from the first coordinator to perform a second operation to extract a second feature from the first sensor data, wherein the second operation comprises a different type of operation than the first operation.

12. The one or more non-transitory computer-readable storage media of claim 11, wherein the first operation comprises detecting gestures and wherein the instructions further cause the one or more processors to perform the step of:
detecting a first gesture within a first image included in the first sensor data, wherein the data associated with the first feature specifies that the first gesture has been detected.

13. The one or more non-transitory computer-readable storage media of claim 11, wherein the second operation comprises at least one of detecting presence of an object within a second image included in the first sensor data or detecting an angle associated with the object within the second image.

14. The one or more non-transitory computer-readable storage media of claim 11, wherein the first operation comprises detecting presence of an object and wherein the instructions further cause the one or more processors to perform the step of:
detecting a first object within a first image included in the first sensor data, wherein the data associated with the first feature specifies that the first object has been detected.

15. The one or more non-transitory computer-readable storage media of claim 11, wherein the first operation comprises detecting an angle associated with an object and wherein the instructions further cause the one or more processors to perform the step of:
detecting a first angle of the object within a first image included in the first sensor data, wherein the data associated with the first feature specifies that the first angle has been detected.

16. The one or more non-transitory computer-readable storage media of claim 11, wherein the instructions further cause the one or more processors to perform the steps of:
determining that a coordinator has not been selected from among the plurality of endpoint devices;
transmitting a second message that specifies a first parameter of the first endpoint device;
receiving, from a second endpoint device included in the plurality of endpoint devices, a third message that specifies a second parameter of the second endpoint device; and
determining whether the first endpoint device is the first coordinator based on the first parameter and the second parameter.

17. The one or more non-transitory computer-readable storage media of claim 16, wherein the first parameter comprises at least one of a duration of time since the first endpoint device was powered on, a media access control (MAC) address associated with the first endpoint device, or an internet protocol (IP) address associated with the first endpoint device.

18. A first endpoint device, comprising:
a memory that includes instructions; and
a processor that is coupled to the memory and, when executing the instructions:
receives first sensor data via a first sensor of the first endpoint device;
receives, from a first coordinator, a command to perform a first operation, the first coordinator being selected from a plurality of endpoint devices that includes the first endpoint device, wherein each endpoint device included in the plurality of endpoint devices are in communication via a communications network;
in response to receiving the command, performs the first operation to extract a first feature from the first sensor data;
transmits a first message that includes data associated with the first feature to the plurality of endpoint devices; and
receives, from the first coordinator, a second command to perform a second operation to extract a second feature from the first sensor data, wherein the second operation comprises a different type of operation than the first operation.

* * * * *